Patented Aug. 11, 1931

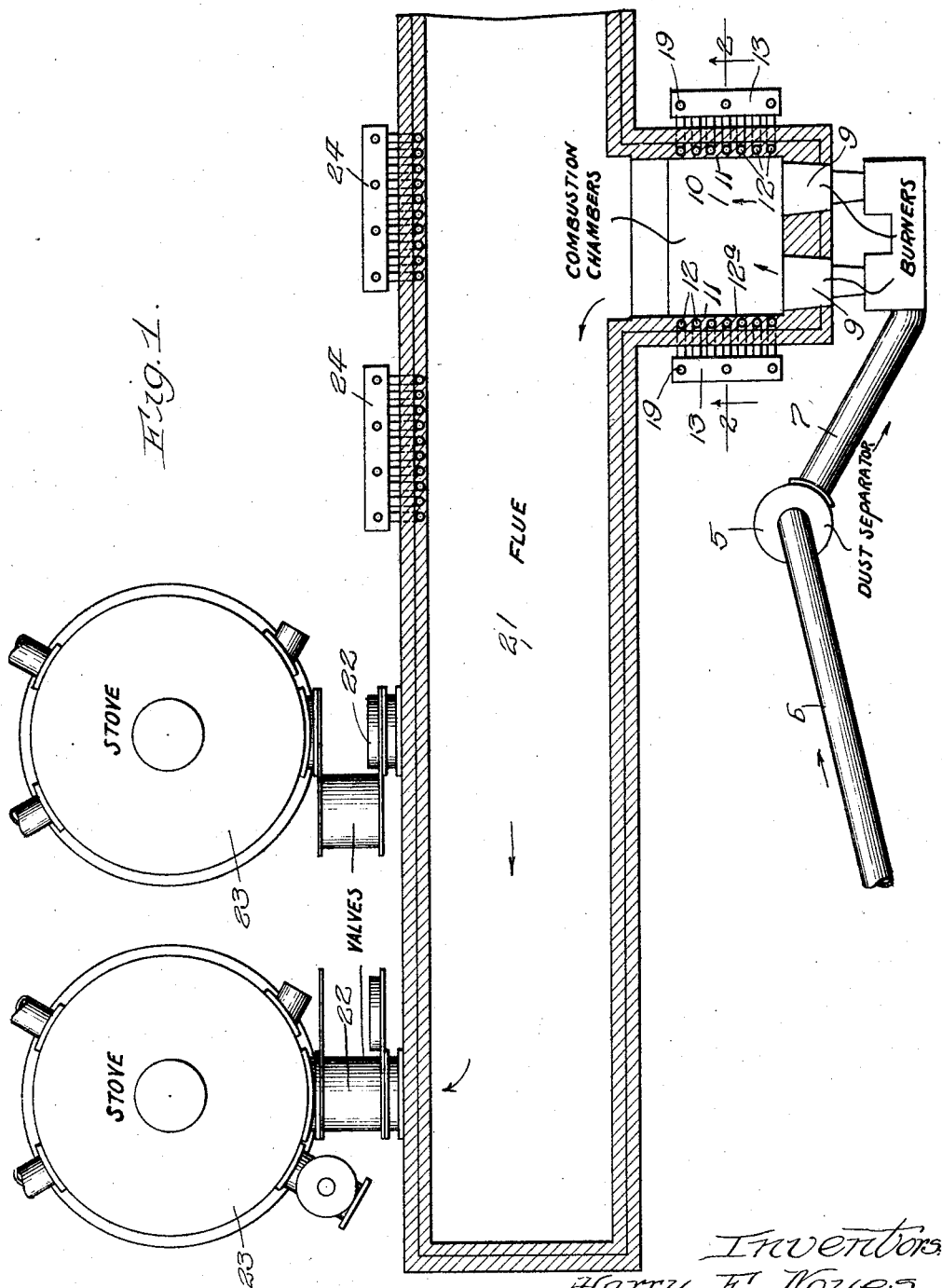

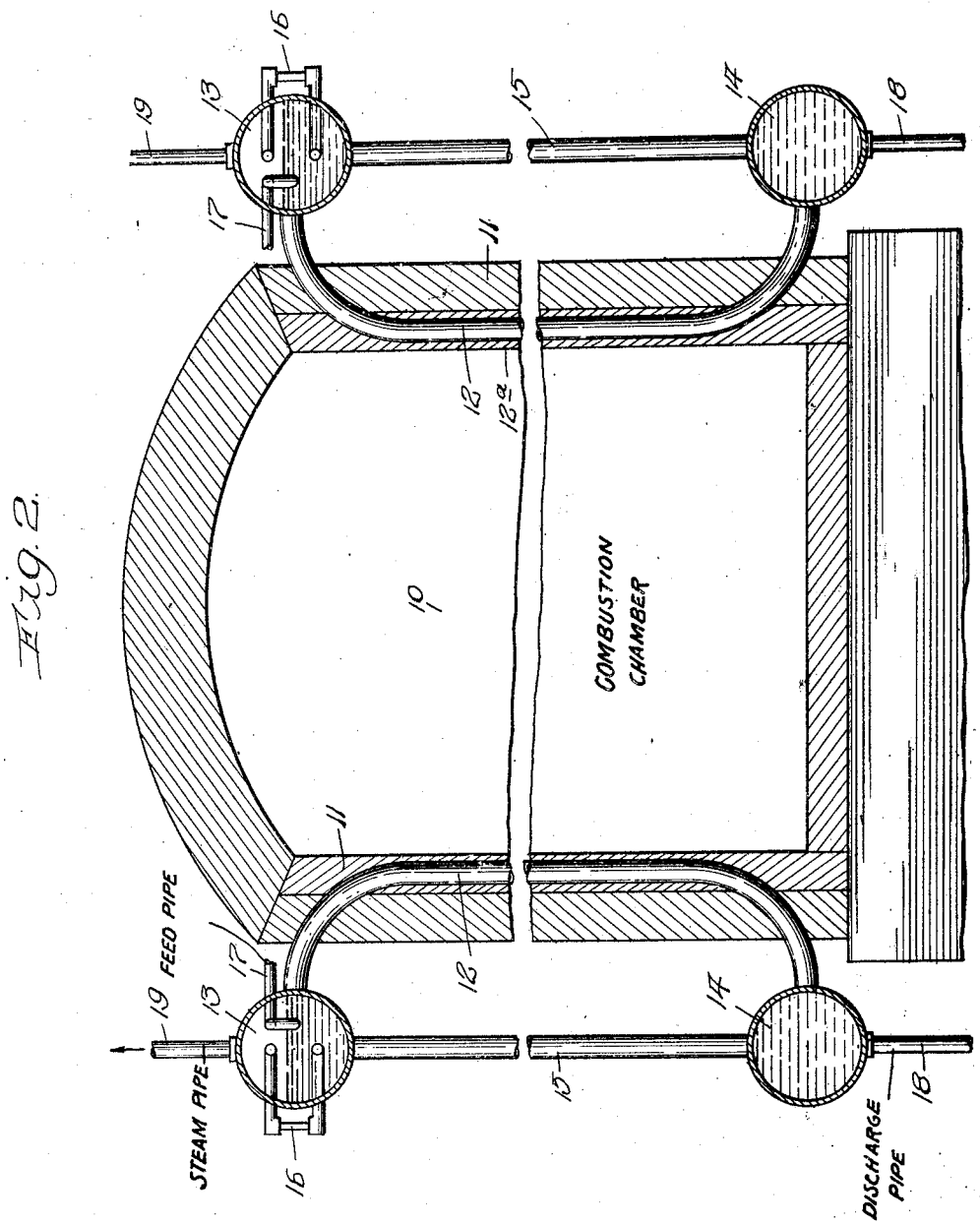

1,818,644

UNITED STATES PATENT OFFICE

HARRY F. NOYES AND ROTHE WEIGEL, OF CHICAGO HEIGHTS, ILLINOIS, ASSIGNORS TO VICTOR CHEMICAL WORKS, A CORPORATION OF ILLINOIS

MANUFACTURE OF PHOSPHORIC ACID AND PHOSPHATE COMPOUNDS

Application filed June 9, 1926. Serial No. 114,708.

The present invention relates to improvements in the handling of gases produced by the combustion of gases containing phosphorus for the manufacture of phosphoric acid and phosphate compounds and more particularly to the removal of fume-like impurities and slag forming ingredients from such gases. The invention further results in the production of a phosphoric acid of a higher degree of purity without additional operating cost, or in reducing the cost of production of acid of the ordinary degree of purity resulting from like processes.

In the volatilization process for the manufacture of phosphoric acid, the high temperatures attained in the smelting zones of the electric and fuel fired furnaces are such as to volatilize or drive off as finely divided solids or fumes, small proportions of the constituents of the charge other than phosphorus, such as silica, lime, magnesia, compounds of iron and aluminum, etc., which are undesirable impurities in phosphoric acid.

The usual method of producing phosphoric acid from the gases evolved from the fuel and electric furnaces is to burn them in combustion chambers or stoves, thus oxidizing the phosphorous to $P_2O_5$ and subsequently collecting it as orthophosphoric acid in any well known manner. These combustion chambers become very highly heated and the solid fumes or impurities are carried along with the $P_2O_5$ and contaminate the phosphoric acid or phosphate product.

It has hitherto been proposed to cool the combustion gases by the direct application thereto of the cooling medium, preferably water. Such a washing process is highly disadvantageous, however, in that substantial quantities of phosphoric acid are removed in solution with the impurities washed out of the combustion gases, and the humidity of the resulting uncondensed gases is excessively increased, the combustion gases carrying along extremely large amounts of steam. We have discovered that an indirect cooling of the gases leaving the phosphorous combustion chamber by passing a suitable cooling medium, such as water, over protected surfaces in heat conductive contact with the gases causes the latter to deposit the impurities in the form of fusable or sintered mass of the character of a slag, at the same time vaporizing the water employed as a cooling medium and producing steam which can be utilized for power and other purposes.

In the accompanying drawings, we have shown apparatus suitable for use in carrying out the present invention. In the drawings, Figure 1 is a diagrammatic plan view, partially in section, showing apparatus for carrying the invention into effect; and Fig. 2 is a vertical sectional view through the combustion chamber employed in carrying out the present invention.

Referring more particularly to the drawings, the numeral 5 indicates a suitable dust collector or separator to which the gases containing phosphorus, carbon-monoxide, and various impurities derived from the phosphate charge in a blast or electric furnace are conducted through the duct 6. From the collector 5 the phosphorus containing gases pass through the duct 7 to the burners 9, from which they pass, together with the proper quantity of air, to the combustion chamber 10 in which combustion takes place, the phosporus being oxidized to phosphorus pentoxid and the carbon-monoxide to carbon dioxide with a very substantial evolution of heat. A suitable form of combustion chamber is illustrated in vertical section in Fig. 2. The combustion chamber 10 is of suitable refractory masonry construction, and in its side walls 11 there are mounted the vertical tubes 12, embedded and protected by carborundum or other suitable refractory and acid resisting material $12^a$. The ends of these vertical tubes are curved to extend outwardly through the walls 11 of the combustion chamber and are connected with the upper and lower drums 13 and 14 respectively. Vertical pipes or downcomers 15 connect these drums exteriorly of the combustion chamber, and a suitable water level is maintained so that a thermosiphon circulation through the tubes 12 is established by the heat imparted thereto by combustion of the phosphorus containing gases. The drums 13 and 14 may be of any suitable construction. The upper drum 13 is preferably provided with a gauge 16 to indicate the water level therein, and with a feed pipe 17. The lower drum 14 is provided suitably with a discharge pipe 18. Steam is withdrawn from the upper drum 13 through the pipe 19. In the form of device illustrated, such a construction is shown on each side of the combustion chamber, so that the opposite walls thereof may be cooled.

From Fig. 1 it will be noted that the combustion chamber 10 opens into a flue 21 provided with goggle-valves 22 leading to suitable stoves or regenerators 23, which may be used alternately to absorb heat from the gases and return it to the air used for the combustion of further gases. As the construction of these devices is not a part of the present invention, they will not be more fully described here. The side walls of the flue 21 are provided at suitable points, and particularly opposite the combustion chamber, with indirect cooling devices 24 of the same type as those provided in the walls of the combustion chamber and above described. It is readily apparent that the steam outlets of the several cooling devices may be manifolded, to permit the use of the steam generated for heat, power or other desired purposes.

By the cooling of the walls or surfaces of the combustion chamber and of the flue which the gases enter after leaving the combustion chamber, a substantial cooling of the gases is effected. We have found that under these conditions, the impurities carried as fume and in volatile form are caused to deposit within the combustion chamber and flue as sintered or fused masses of a slag-like nature. A substantial enhancement of the purity of the gases is thus effected while at the same time the heat of the combustion gases is utilized in a practical manner for the production of steam for power, heat and other purposes. It is readily apparent that the cooling may be effected by means of other media than water. It is preferred, however, to operate in the manner hereinbefore set forth.

It is to be understood that the particular apparatus described above is intended to be merely illustrative and not limitative, of the invention, since it is obvious that the cooling of the gases may be effected by cooled surfaces arranged in many other different ways, within the scope of the appended claims.

We claim:

1. The method of producing oxidized products from phosphorus containing gases from volatilization furnaces and containing impurities derived therefrom which comprises burning such gases and effecting heat conductive contact between said gases and refractory surfaces in close proximity to the area of combustion and while the gases are carrying their full content of impurities, and cooling such refractory surfaces by passing water through closed passages therein, thereby forming sintered, slag-like masses including said impurities while permitting the phosphorus oxide to stay in suspension.

2. The method of removing vaporized impurities from hot gases laden with phosphorus oxide, which consists in burning gases from phosphorus volatilization furnaces containing phosphorus, carbon monoxide and impurities in a chamber, and cooling the walls of the chamber in which the combustion of said gases takes place, to such an extent that said impurities are precipitated in sintered slag-like form while the phosphorus oxide is carried off by the gases.

HARRY F. NOYES.
ROTHE WEIGEL.